Patented Oct. 10, 1944

2,360,006

UNITED STATES PATENT OFFICE 2,360,006

INSECTICIDAL PREPARATION

Albert C. Mohr, Berkeley, Calif., assignor to Stauffer Chemical Company, a corporation of California No Drawing. Application March 4, 1941, Serial No. 381,663

13 Claims. (Cl. 167—20)

This invention relates to insecticidal compositions particularly those containing an antimonyl derivative of an alpha hydroxy aliphatic acid and useful when dusted.

Antimonyls are effective in insect control, particularly thrips. Tartar emetic is the best known antimonyl and while the invention will, therefore, be disclosed in connection with tartar emetic, it is not to be considered as so limited except insofar as tartar emetic constitutes one of the preferred forms of antimonyl compounds with which the present invention is concerned. The various antimonyls, including tartar emetic, are relatively expensive. Therefore, their use on large scale pest control must be relatively efficient. The present invention relates particularly to insecticidal dusting compositions whereby the application of antimonyls, particularly tartar emetic, is facilitated to the end that pest control can be secured with greater surety and at less cost.

The antimonyls are not effective unless taken internally by the thrips. Study of their feeding habits disclosed that they usually clean away the area whereat they feed. However, sweet materials apparently make them greedy and reckless. By associating sweetening agents with antimonyls control over thrips can be secured. Thrips thrive in hot, relatively dry climates. I have found that dusting compositions which include a hygroscopic material are very effective because thereby the sweetening agent is made more attractive at all times.

Several compositions within the generic contemplation of the present invention will be disclosed to illustrate the preferred form of the composition.

Example I

A mixture was made up by grinding and mixing together (on a weight basis) the following dry materials:

| | Per cent |
|---|---|
| Refined dusting sulphur | 87 |
| Tartar emetic | 5 |
| Sugar (dry) | 5 |
| Vacatone | 3 |

This material was dry and free flowing before dusting. When dusted, it became damp and the sugar was maintained wet and, therefore, very attractive to the thrips by the presence of the Vacatone, a spray dried molasses, hygroscopic in character. Vacatone is produced and sold by U. S. Industrial Chemicals. No apparent injury to the vegetation resulted.

Since both sulphur and tartar emetic are effective against thrips the composition possesses several advantages both before and after application as will further appear.

Example II

In place of sulphur as a carrier there was incorporated into the composition and mixed with the tartar emetic a dry, inert carrier comprising diatomaceous earth. This composition was not quite as effective as that of Example I due to the absence of sulphur. However, it is useful, particularly against light infestations.

Example III

To materials made up in accordance with Examples I and II about 1% by weight of a suitable hygroscopic wetting material was added in place of the Vacatone. A preferred material is Invadine C, an alkylnaphthalenesulfonic acid. One can use any suitable hygroscopic wetting material such as the water solubilized hydrocarbon containing a sulphonic group and made in accordance with the Reed Reissue Patent 20,968. The hygroscopic wetting material is ordinarily added in amounts sufficient to maintain the sugar or other sweet attractant wet when the material is dusted on the trees and thus ensure that the sweetening agent is maintained active as an attractant for the thrips. At the same time, the wetting agent increases adherence of the atmospheric moistened dust to the vegetation. This increases the effective period of the dust.

The hygroscopic material should be neutral or slightly acid; in any event it should not be alkaline for the antimonyls apparently lose their effectiveness when alkalinized. Other suitable wetting and hygroscopic materials are Aerosol OS, Invadine N, Atlas G759, Napsul, Aresket, and Grasselli 2-A (Alkanol B). These are described in a publication of the Bureau of Entomology, E-504, dated June, 1940. Any suitable non-alkaline hygroscopic material can be employed.

Example IV

A mixture was made up of 5% tartar emetic and 93% Frianite, a pumice, 2% Invadine N. Previously 15% of dry walnut shell flour carrying 6% glucose had been mixed into the Frianite. The wetting agent acted as an attractant to draw the glucose out of the shell flour and sweeten the tartar emetic over a goodly period of time whereby the effectiveness and persistence of the material was increased.

Example V

Antimonyl dusts including sulphur and an attractant and compounded with and without the hygroscopic material have certain unique properties. These will be explained here.

Free flowing, finely divided dry sulphur is a commonly employed insecticide and fungicide material. The sulphur is ordinarily dusted upon the vegetation to free and to protect the vegetation from the attack of insects, fungi, and the like, harmful to the vegetation.

One of the problems in the handling of dry dusting sulphur is that of ensuring that the sulphur remains free flowing and finely divided. It has been shown that one of the factors affecting the efficiency of a dusting sulphur is its fineness of division. Sulphur is only produced in finely divided form by relatively expensive methods, usually by grinding. Obviously, it is a waste of time and effort to grind sulphur to a fine state of division if subsequently it is permitted to agglomerate upon itself and form relatively large massive particles. Various conditioning materials have been added to the sulphur and an art has developed in the conditioning of sulphur to ensure that it is maintained free flowing, finely divided and in an extremely fine state of division, even though the sulphur be subject to storage in sacks stacked one upon the other for a considerable period of time, and possibly even in a humid atmosphere.

One of the insects against which sulphur has been employed with great success has been the aforementioned thrips, particularly citrus thrips. It has also lately been discovered that antimonyls as tartar emetic, potassium antimonyl tartrate are also effective in the control of thrips. I have discovered that a composition can be made up successfully of dry finely divided sulphur and tartar emetic, for example, and that this composition remains dry, free flowing and in its original finely divided state of subdivision. Apparently the sulphur and tartar emetic exert a mutual conditioning action one upon the other, because I have found that under storage conditions the mixture remains free flowing and satisfactory. This is unexpected because tartar emetic contains a half mol of water of crystallization and is water soluble. Ordinarily materials which are water soluble, or which possess water of crystallization are not satisfactory conditioners for sulphur and tend to enhance the packing and agglomeration of the finely divided sulphur material.

The amount of tartar emetic can be varied, but I have successfully employed amounts up to 10%, usually from 1% to 10%, although less than 1% can be employed, but ordinarily amounts smaller than this are not effective from a thrips control standpoint. Larger amounts of tartar emetic are effective; since these increase the cost their use is usually out of the question. Because insects are not attracted to the tartar emetic unless some insect attractant is present, I preferably include in the composition such a material. With thrips, sugar can be successfully employed, but any other attractant material can be used in place of sugar. Ordinary cane or beet sugar, or other dry, non-hygroscopic sweetening material attractive to the insects can be employed. The amount of sugar is varied between 1% and 10%, ordinarily equal amounts of sugar and tartar emetic being employed in the composition. The composition is made up preferably by adding the materials together in bulk prior to grinding and then grinding the mass to the state of subdivision desired.

Example VI

In each of the above compositions potassium antimonyl citrate was substituted. This material is also effective against thrips. Usually it should be employed in an amount from 50% to 100% more than tartar emetic for equal effectiveness. The carrier is decreased accordingly.

Other carriers

In place of sulphur and diatomaceous earth other carriers can be used such as finely divided walnut shell flour, peach pit flour, apricot pit flour, talc, soapstone, wood flour, pumice such as Frianite from Friant, California, bentonite and the like. The carriers are preferably neutral or slightly acid if not entirely inert.

Other antimonyls

Tartar emetic is the best known antimonyl compound but the invention is applicable to other antimonyls of aliphatic acids including an alpha hydroxy group such as glycolic, lactic, alpha hydroxy butyric, citric, malic and mucic acid. The antimonyl should be one only fairly soluble in water such as a sodium, potassium, lithium, magnesium or ammonium compound or an organic derivative of ammonia, such as an alkylamine, analine, or a simple heterocyclic organic nitrogen compound, an alkaloid, alkyl and sulphonium antimonyl derivative; antimonyls of double salts such as calcium-sodium, sodium-lithium, calcium-lithium, potassium-lithium, zinc-calcium, calcium-zinc and calcium-potassium can also be used; antimonyls of calcium and zinc are generally too water soluble and difficulty in manufacture has been experienced in isolating these in crystalline or dry form.

Application

The several compositions disclosed and others within the generic contemplation of this invention may be applied in the usual manner as dry dusts. When so applied, the composition is quite effective, particularly when the sweet attractant is included so that the antimonyls are effective against thrips. The materials can also be applied simultaneously and in conjunction with wet sprays in a so-called "Vapo-duster," a device which ejects the dry material as a dust and simultaneously mixes the dry dust with a forcefully ejected highly atomized liquid such as water or a spray composition usually having water for the base and possibly including one or more insecticides or fungicides. The simultaneous ejection of the dry material together with the atomized liquid ensures that the dust sticks well to vegetation although it is not wetted to such an extent that its efficiency as a dust is lost.

This application is a continuation in part of application Ser. No. 297,319 filed September 30, 1939.

To summarize, the composition of the present invention is made up as follows:

| | Per cent |
|---|---|
| The antimonyl | 1 to 20 |
| The carrier | 97 to 60 |
| A sugar | 1 to 10 |
| Hygroscopic material | ½ to 10 |

As is explained under Example V, the hygroscopic material may be omitted in certain instances while sugar can be replaced by other equivalent attractants. The carriers and antimonyls are discussed under the headings "Other carriers" and "Other antimonyls."

I claim:

1. A composition of the class described comprising a free flowing finely divided dry intimate and homogeneous mixture of

| | Per cent |
|---|---|
| Tartar emetic | 1 to 10 |
| Sugar | 1 to 10 |
| Sulphur | 98 to 80 |

2. A composition of the class described comprising a free flowing finely divided dry intimate and homogeneous mixture of

| | Per cent |
|---|---|
| Tartar emetic | 1 to 10 |
| Sulphur | 99 to 90 |

3. A composition of the class described comprising a free flowing, finely divided, dry, intimate, homogeneous mixture of tartar emetic and sulphur, said sulphur being present as the major constituent and said tartar emetic as the minor constituent of said composition.

4. A composition of the class described comprising a free flowing, finely divided, dry, intimate, homogeneous mixture of sulphur and an antimonyl derivative of an aliphatic acid containing an alpha hydroxy group, said sulphur being present as the major constituent and said antimonyl derivative as the minor constituent of said composition.

5. A composition of the class described comprising a free-flowing, finely divided, dry, intimate, substantially homogeneous mixture of a minor proportion of tartar emetic, a major proportion of a carrier admixed therewith, a small amount of a sweetening agent, and a small amount of a material selected from the group consisting of neutral hygroscopic materials and slightly acid hygroscopic materials, and said material being present in such a small amount and being so uniformly distributed throughout the dry mixture that its hygroscopicity is only effective when said composition is distributed as a dust.

6. A composition of the class described comprising a free-flowing, finely divided, dry, intimate, substantially homogeneous mixture of a minor proportion of an antimonyl derivative of an aliphatic acid containing an alpha hydroxy group, a major proportion of a carrier admixed therewith, a small amount of a sweetening agent, and a small amount of a material selected from the group consisting of neutral hygroscopic materials and slightly acid hygroscopic materials, and said material being present in such a small amount and being so uniformly distributed throughout the dry mixture that its hygroscopicity is only effective when said composition is distributed as a dust.

7. A composition of the class described comprising a free-flowing, finely divided, dry, intimate, substantially homogeneous mixture of a minor proportion of tartar emetic, a major proportion of finely divided sulphur admixed therewith, a small amount of a sweetening agent, and a small amount of a material selected from the group consisting of neutral hygroscopic materials and slightly acid hygroscopic materials, and said material being present in such a small amount and being so uniformly distributed throughout the dry mixture that its hygroscopicity is only effective when said composition is distributed as a dust.

8. A composition of the class described comprising a free-flowing, finely divided, dry, intimate, substantially homogeneous mixture of a minor proportion of an antimonyl derivative of an aliphatic acid containing an alpha hydroxy group, a major proportion of finely divided sulphur admixed therewith, a small amount of a sweetening agent, and a small amount of a material selected from the group consisting of neutral hygroscopic materials and slightly acid hygroscopic materials, and said material being present in such a small amount and being so uniformly distributed throughout the dry mixture that its hygroscopicity is only effective when said composition is distributed as a dust.

9. A composition of the class described comprising a free-flowing, finely divided, dry, intimate, substantially homogeneous mixture of a minor proportion of tartar emetic, a major proportion of finely divided sulphur admixed therewith, and a small amount of a non-alkaline hygroscopic molasses admixed therewith and present in such a small amount and being so uniformly distributed throughout said dry mixture that its hygroscopicity is only effective when the composition is distributed as a dust.

10. A composition of the class described comprising a free-flowing, finely divided, dry, intimate, substantially homogeneous mixture of a minor proportion of an antimonyl derivative of an aliphatic acid containing an alpha hydroxy group, a major proportion of finely divided sulphur admixed therewith and a small amount of a non-alkaline hygroscopic molasses admixed therewith and present in such a small amount and being so uniformly distributed throughout said dry mixture that its hygroscopicity is only effective when the composition is distributed as a dust.

11. A composition of the class described comprising a free flowing finely divided dry intimate and homogeneous mixture of

| | Per cent |
|---|---|
| An antimonyl derivative of an aliphatic acid containing an alpha hydroxy group | 1 to 20 |
| A carrier | 97 to 60 |
| A sugar | 1 to 10 |
| A hygroscopic material | ½ to 10 |

Said hygroscopic material being selected from the group consisting of neutral hygroscopic materials and slightly acid hygroscopic materials, said material being present in such small amount and being so uniformly distributed throughout said dry mixture that its hygroscopicity is only effective when said composition is distributed as a dust.

12. A composition of the class described comprising a free flowing finely divided dry intimate and homogeneous mixture of

| | Per cent |
|---|---|
| Tartar emetic | 1 to 20 |
| A carrier | 97 to 60 |
| A sugar | 1 to 10 |
| A hygroscopic material | ½ to 10 |

Said hygroscopic material being selected from the group consisting of neutral hygroscopic materials and slightly acid hygroscopic materials, said material being present in such small amount and being so uniformly distributed throughout said dry mixture that its hygroscopicity is only effective when said composition is distributed as a dust.

13. A composition of the class described comprising a free flowing finely divided dry intimate and homogeneous mixture of

| | Per cent |
|---|---|
| An antimonyl derivative of citric acid | 1 to 20 |
| A carrier | 97 to 60 |
| A sugar | 1 to 10 |
| A hygroscopic material | ½ to 10 |

Said hygroscopic material being selected from the group consisting of neutral hygroscopic materials and slightly acid hygroscopic materials, said material being present in such small amount and being so uniformly distributed throughout said dry mixture that its hygroscopicity is only effective when said composition is distributed as a dust.

ALBERT C. MOHR.